United States Patent [19]

Sandels

[11] Patent Number: 4,978,563
[45] Date of Patent: Dec. 18, 1990

[54] SELF REPAIRING ELASTIC BODIES

[76] Inventor: Claes M. C. Sandels, Sandhamnsgatan 21, Stockholm, Sweden

[21] Appl. No.: 306,898

[22] Filed: Feb. 7, 1989

[51] Int. Cl.⁵ .......................... B29C 73/22; B32B 35/00
[52] U.S. Cl. ...................................... 428/63; 152/505; 152/507; 156/97; 428/71; 428/912
[58] Field of Search ............... 152/502, 503, 504, 505, 152/506, 507; 156/95, 97, 145; 428/63, 71, 912

[56] References Cited

U.S. PATENT DOCUMENTS

| | | | |
|---|---|---|---|
| 1,239,291 | 9/1917 | Morse | 152/502 X |
| 3,444,918 | 5/1969 | Goggins | 152/505 |
| 3,536,576 | 10/1970 | Schwartz | 428/63 X |
| 4,013,111 | 3/1977 | Powell | 152/502 |
| 4,149,579 | 4/1979 | Senger | 152/505 |

Primary Examiner—Henry F. Epstein

[57] ABSTRACT

The invention refers to an elastic body by synthetic material or rubber which is equipped with tube like hollow spaces in which capsules, containing a foam creating liquid, are arranged. At an explosion or other outer pressure influence the capsules will break and the liquid (foam) will fill up the hollow spaces and will get stiff to an elastic foam. The invention can be used for example manufacturing of tires.

2 Claims, 2 Drawing Sheets

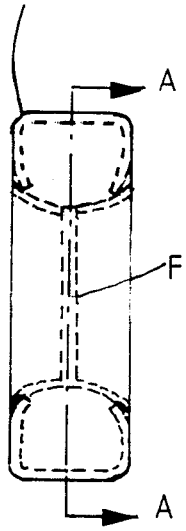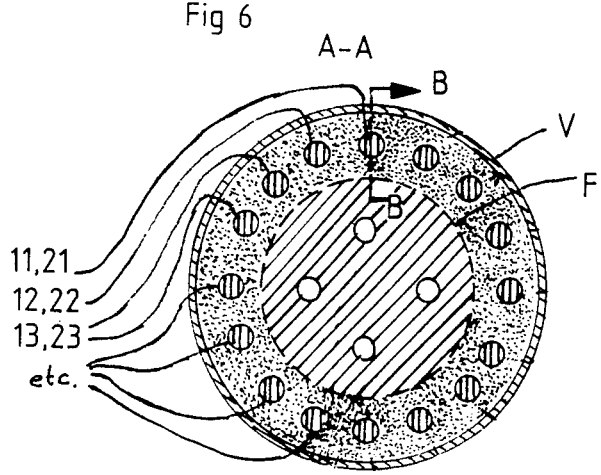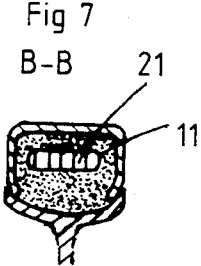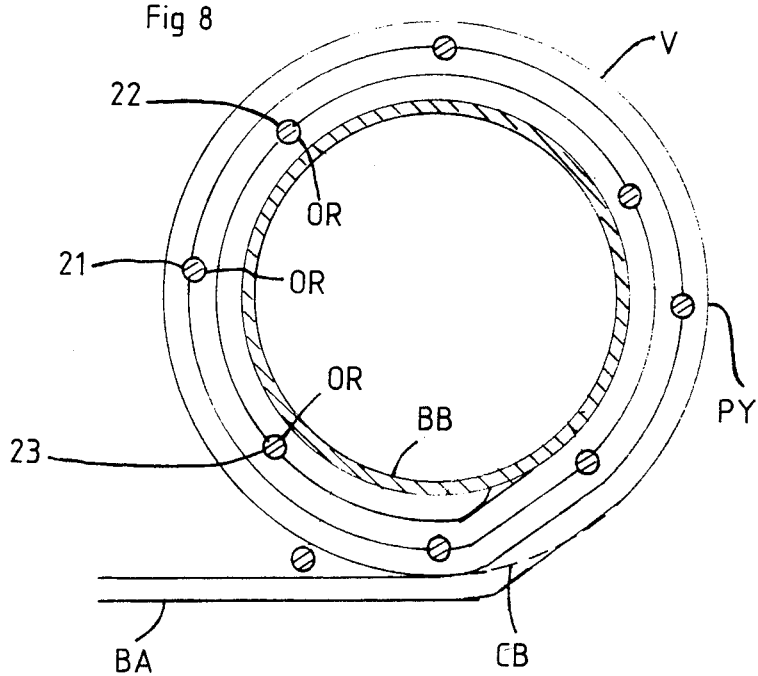

SELF REPAIRING ELASTIC BODIES

The present invention relates to an elastic body, which is constructed in a way making it less sensitive for damage. It keeps on the whole its elastic qualities even after a damage.

The invention is based on the fact that air or other gas is used as a medium for elasticity under pressure but that this elastic medium is sensitive for damage, intentional or unintentional. Elastic materials made of i.e. rubber or synthetic material in a more or less porous shape can substitute air or gas as an elastic medium.

The invention shows ways for manufacturing and constructions for elastic bodies equipped with certain organs enclosed in mentioned bodies. The organs are capsules, containing such liquid, that this liquid at the break of a capsule, rapidly expands to a foam which rapidly congeals.

In every application, where an elastic body is to be an integral part and highest degree of security is aimed at for the function of the elastic body, the described arrangement in this invention is more secure than the arrangements which are using air or any other gas under pressure. It is self repairing both at intentional or unintentional damage.

The invention will be described with reference to the accompanying drawings where FIG. 1 shows a body of elastic material according to the invention, containing two hollow spaces with organs installed.

FIG. 5 shows a tire on a rim, which constitutes an application of the invention.

FIG. 6 shows a cross section of the tire according to the arrows A—A in FIG. 5.

FIG. 7 shows a cross section B—B which is marked by the arrows in FIG. 6.

FIG. 8 shows a method of manufacturing tires.

Figure 1:
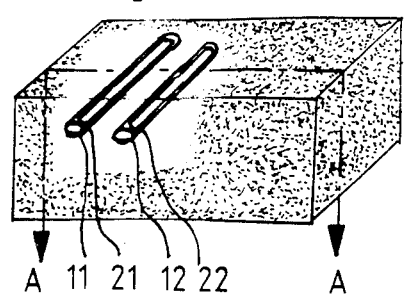
FIG. 1a shows a capsule which is installed in the body according to FIG. 1.
Figure 1A:
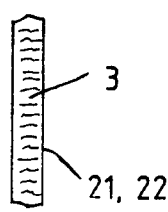

The invention will according to a first alternative be described in a universal application. FIG. 1 shows an elastic body E made of for instance rubber in the shape of a rectangular parallelepiped. The body E can have any other shape whatever. Inside the body E there are a number of cylinder-shaped hollow spaces (11,12, . . . ) which are situated parallelly and at a suitable distance from each other, which is determined by the weight of the body and the security required. In every hollow space (11,12, . . . ) there are a number of organs in the shape of a capsule (21,22, . . . ) inserted where the capsule fully or partly fills the hollow space. The capsule is thus loosely of firmly arranged in the hollow space, respectively. Each capsule (21, 22, . . . ) contains according to FIG. 1a a medium 3, i.e. a polymeric liquid which at a sudden decrease of pressure will expand to a foam which immediately congeals.

Figure 2:
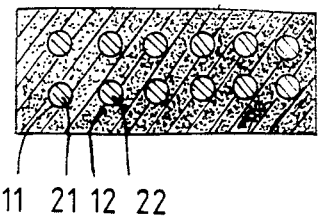
FIG. 2 shows a cross section of the body in FIG. 1 according to arrows A—A.

FIG. 2 shows a cross-section of the parallelepipedic body E according to FIG. 1, arrows A—A where the locations of the hollow spaces and the organs in the body E are more clear.

Figure 3A:
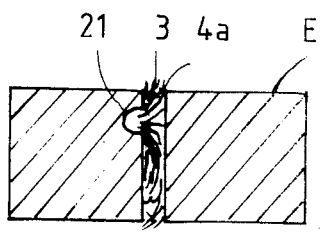
FIG. 3a shows a damage caused by a projectile.
Figure 3B:
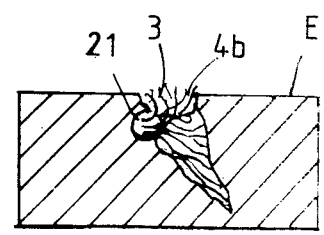
FIG. 3b shows a damage caused by an explosion.

FIGS. 3a, 3b intend to show the principles according to the invention. FIG. 3a shows the body E according to FIG. 1 with a cavity or a crack 4a caused by for instance a projectile, which at a high speed has hit one side of the body. In FIG. 3b a cavity is shown which is caused by for instance an explosion.

The cavities 4a, 4b in the material according to FIGS. 3a and 3b will cause the capsules in the hollow spaces which are situated most closely to the respective cavity to break, whereby the medium 3 will spout and fill up the cavity and congeal. It is thus assumed that the damage on the material of the body E has occured in that way that one or several capsules have been hit and thereby been damaged so that the medium has been activated according to the above. There can be a case where no capsules have been hit and damaged and thereby no filling has occured. The probability that this occurs increases with decreased number of capsules (capsule/hollow space density) but a judgement must be done from one application to another.

The body will on the whole keep its elastic qualities after a damage. A trajectory or another cut surface will immediately be filled by new elastic mass. Even damages by a sudden change in pressure may have automatic self repairing by spouting liquid.

Figure 4A:
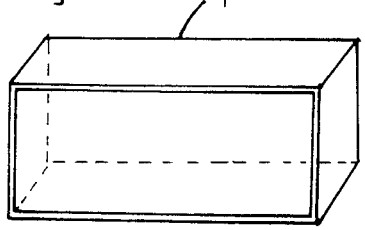
FIG. 4a shows a mould to cast an elastic body according to FIG. 1.
Figure 4B:
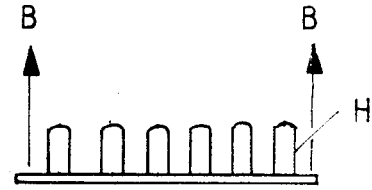
FIG. 4b shows the mould which forces the holes to be shaped in the cast according to FIG. 2.

FIGS. 4a and 4b intend to show a principle for the manufacturing of an elastic body with the confined hollow spaces in which thereafter the organs with the confined liquids are placed. In a mould F according to FIG. 4a two pieces of elastic bodies are cast. At the same time the mould tool in FIG. 4b is inserted in the mould F, the fore, open part, in the direction marked B—B in FIG. 4b. The two bodies, which are symmetric in this example, are then put together by for instance glue after that the desired organs (21, 22, . . . ) according to FIG. 2 are installed.

The variations how the bodies should look like and how the hollow spaces and the organs are placed in these spaces are without limitations. Here is the basic principle described. Bodies can be made, which consists of a arbitrary number of joined part bodies and where the organs are placed precisely in the figuration which is desired.

Also, the medium 3 in the capsules can be exchanged by another liquid matter than a liquid by polymer composition but with the quality that in case of a sudden decrease of pressure, it will expand to an elastic material.

In FIG. 5 and FIG. 6 there is shown an application of the invention on a tire V (massive) on a rim F. Outside it looks like a regular tire of today. In FIG. 6 the same tire V is shown in a cross-section according to the arrows A—A in FIG. 5. With small dots in the cross-section, have been marked, that this is filled up by a more or less porous, soft material with elastic qualities. In FIG. 6 the hollow spaces (11,12,13, . . . ) are shown in addition to the capsules (21,22,23, . . . ) marked by vertical lines. That is cross sections of the inserted organs (11,21; 12,22; 13,23; . . . ) which contain that medium which, at the break of the capsule, rapidly will expand to an elastic foam. The number of organs which are placed in the elastic mass of the tire, is among other things, dependent on the security one requires against for instance damage on purpose of the tire. The organs according to the above have in the figure a certain symmetric location but can naturally be placed in any manner, i.e. according to what a designer in every single case will judge as the best. FIG. 7 shows a cross-section according to B—B in FIG. 6 which visualizes a location of the organs parallel with the tread of the tire. The inclination in this plane can be chosen according to what the designer thinks best.

FIG. 8 shows an alternative manufacturing method of round bodies, for instance tires, which is different from the earlier described manufacturing methods.

With the help of a long, elastic band BA, the tire is built up. The band is fastened on a bobbin BB with an outer diameter which is equal to the inner diameter of the tire. Thereafter the long band is rolled up on the bobbin BB, at which one places at different locations the organs OR (=the capsules 21,22,23, . . . containing the medium earlier described) on the more or less elastic band BA. The capsules 21,22,23, . . . are then kept at place by being confined between the rounds of the band. It is possible to make the method very fast in an industrial scale. The bobbin is rotated in a high speed when the capsules at the same time are shot towards the line where the band is touching the earlier round of the band. The density of capsules one wants to have in the tire is determined by such factors as for instance security, elasticity and weight. The line of short dashes CB in FIG. 8 marks the cut off which must be made on the end of the band to achieve a circular outer shape.

The tire according to FIG. 6 can be exchanged to a combination of an inner tire V, of less dimension than that in FIG. 6, added by an outer gas filled tire, mounted on the periphery of the inner tire. Thereby one achieves a lower inertia and in some cases more favourable elastic qualities.

The technique to give a body of elastic material a protection against deformation by enclosing organs with such medium and under that pressure that it, at the break of the organ, expands to an elastic, stiff foam is useable not only under normal atmospheric pressure but also under other pressures and in vacuum (i.e. outer space).

I claim:

1. An elastic body consisting of rubber or synthetic material with an arbitrary shape essentially keeping its elastic qualities after being damaged by a blow, hits, cracking or external pressure change, said elastic body containing a plurality of hollow spacings in the form of tubes extending in random directions throughout the body, said tubes being uniformly distributed inside the body and having an arbitrary crosssection essentially smaller than an overall dimension of the body, at least some of said tubes including organ means for enclosing a foamable a liquid medium wherein at a sudden pressure change said organ means breaks and said foamable liquid medium expands to a foam which rapidly congeals filling its associated surrounding tube and a possible empty space created by said damage of the elastic body.

2. An elastic body as claimed in claim 1 wherein said organ means consists of a capsule enclosing said foamable liquid medium and having such a shape and dimension so as to be disposed at least partly filling up said associated surrounding tube.

* * * * *